US012561249B2

(12) United States Patent
Kalyanasundharam et al.

(10) Patent No.: US 12,561,249 B2
(45) Date of Patent: Feb. 24, 2026

(54) PREFETCHING USING A DIRECT MEMORY ACCESS ENGINE

(71) Applicant: ADVANCED MICRO DEVICES, INC., Santa Clara, CA (US)

(72) Inventors: Vydhyanathan Kalyanasundharam, Santa Clara, CA (US); Christopher J. Brennan, Boxborough, MA (US); Joseph L Greathouse, Austin, TX (US); Mark Fowler, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/388,940

(22) Filed: Nov. 13, 2023

(65) Prior Publication Data

US 2025/0156329 A1     May 15, 2025

(51) Int. Cl.
*G06F 12/0862* (2016.01)
*G06F 13/28* (2006.01)

(52) U.S. Cl.
CPC .......... *G06F 12/0862* (2013.01); *G06F 13/28* (2013.01)

(58) Field of Classification Search
None
See application file for complete search history.

(56) References Cited

U.S. PATENT DOCUMENTS

| | | | | |
|---|---|---|---|---|
| 6,003,106 | A | 12/1999 | Fields, Jr. et al. | |
| 7,010,626 | B2 * | 3/2006 | Kahle | G06F 13/28 |
| | | | | 710/33 |
| 8,316,158 | B1 | 11/2012 | Wright et al. | |
| 8,627,008 | B2 * | 1/2014 | Qureshi | G06F 12/0862 |
| | | | | 711/146 |
| 11,080,051 | B2 | 8/2021 | Kerr et al. | |
| 11,995,351 | B2 * | 5/2024 | Greathouse | G06F 13/28 |
| 2004/0193754 | A1 * | 9/2004 | Kahle | G06F 13/28 |
| | | | | 710/22 |
| 2005/0144337 | A1 * | 6/2005 | Kahle | G06F 13/28 |
| | | | | 710/22 |
| 2008/0046657 | A1 * | 2/2008 | Eichenberger | G06F 12/0862 |
| | | | | 711/137 |
| 2009/0063777 | A1 * | 3/2009 | Usui | G06F 12/0862 |
| | | | | 711/137 |

(Continued)

OTHER PUBLICATIONS

International Search Report and Written Opinion mailed Oct. 2, 2024 for PCT/US2024/034102, 9 pages.

*Primary Examiner* — Michael Sun

(57) ABSTRACT

A processing system includes one or more DMA engines that load data from memory or another cache location without storing the data after loading it. As the data propagates past caches located between the memory or other cache location that stores the requested data ("intermediate caches"), the data is selectively copied to the intermediate caches based on a cache replacement policy. Rather than the DMA engine manually storing the data into the intermediate caches, the cache replacement policies of the intermediate caches determine whether the data is copied into each respective cache and a replacement priority of the data. By bypassing storing the data, the DMA engine effectuates prefetching to the intermediate caches without expending unnecessary bandwidth or searching for a memory location to store the data, thus reducing latency and saving energy.

18 Claims, 6 Drawing Sheets

(56)         References Cited

U.S. PATENT DOCUMENTS

| 2012/0254576 | A1* | 10/2012 | Dedeoglu | G06F 16/9027 |
| | | | | 711/E12.002 |
| 2015/0339062 | A1* | 11/2015 | Toyoda | G06F 3/0656 |
| | | | | 711/118 |
| 2016/0055107 | A1 | 2/2016 | Ambroladze et al. | |
| 2019/0042436 | A1* | 2/2019 | Klemm | G06F 12/0862 |
| 2021/0255869 | A1 | 8/2021 | Sankaranarayanan et al. | |
| 2023/0359581 | A1* | 11/2023 | Gibb | G06F 13/404 |
| 2024/0104025 | A1* | 3/2024 | George | G06F 12/0811 |

* cited by examiner

600

602 — RECEIVE COMMAND AT DMA ENGINE

604 — SEND PREFETCH REQUEST FROM DMA ENGINE

606 — CHECK INTERMEDIATE CACHES FOR REQUESTED DATA

608 — RETURN REQUESTED DATA FROM INTERMEDIATE CACHE OR FROM SYSTEM MEMORY

610 — SELECTIVELY COPY RETURNED DATA TO INTERMEDIATE CACHE(S) BASED ON CACHE REPLACEMENT POLICY AND PRIORITY

612 — BYPASS STORING DATA FOR DMA ENGINE

PREFETCHING USING A DIRECT MEMORY ACCESS ENGINE

BACKGROUND

A system direct memory access (DMA) engine is a hardware device which coordinates direct memory access transfers of data between devices (e.g., input/output interfaces and display controllers) and memory, or between different locations in memory, within a computer system. A DMA engine is often located on a processor, such as a central processing unit (CPU) or an accelerated processing unit and receives commands from an application running on the processor. Based on the commands, the DMA engine reads data from a DMA source (e.g., a first memory buffer defined in memory) and writes data to a DMA destination (e.g., a second buffer defined in memory).

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
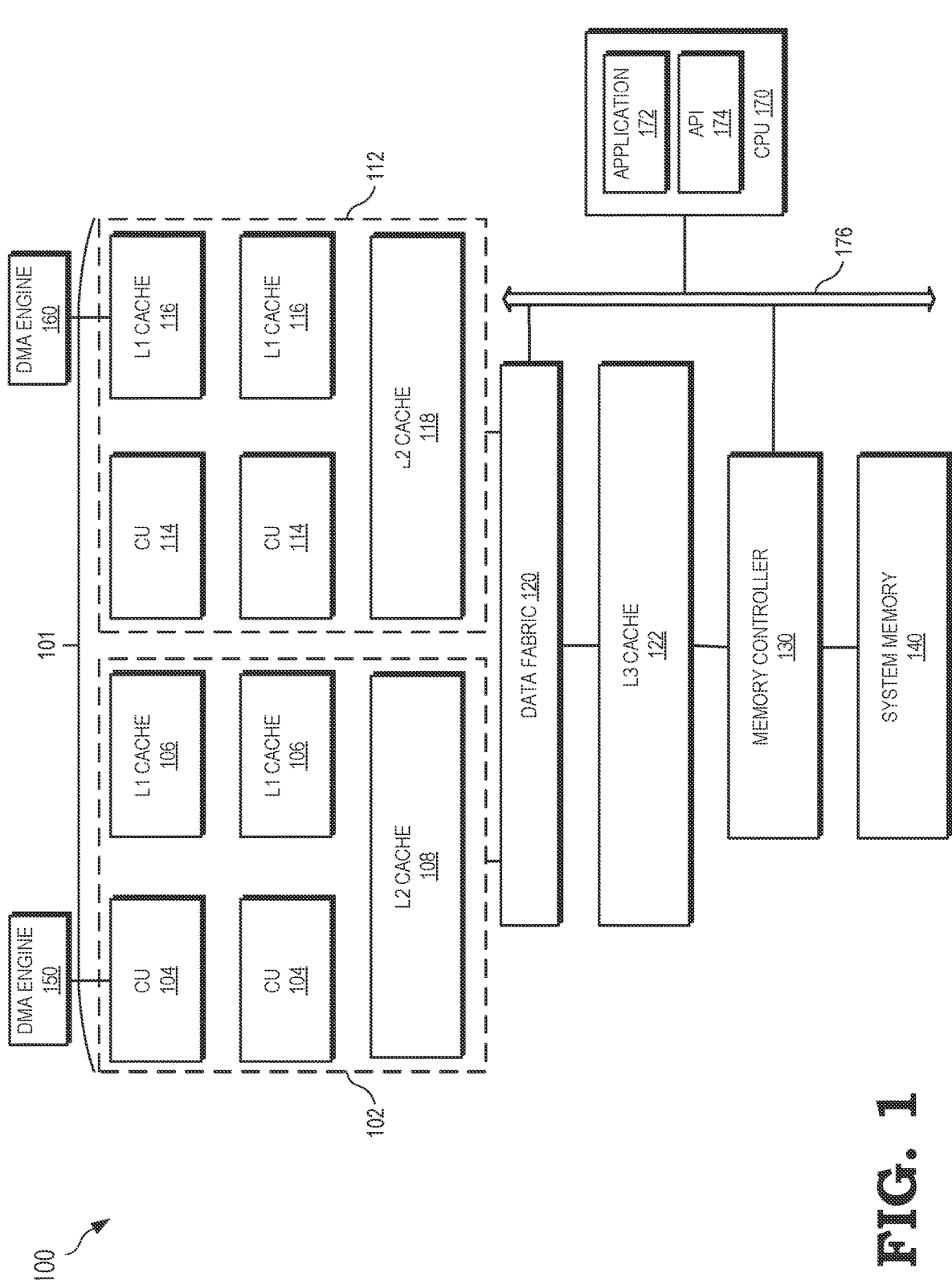
FIG. 1 is a block diagram of a processing system including a direct memory access (DMA) engine configured to prefetch data to one or more caches in accordance with some embodiments.

Conventional processors include one or more DMA engines to read and write blocks of data stored in a system memory. The DMA engines relieve processor cores from the burden of managing transfers. In response to data transfer requests from the processor cores, the DMA engines provide requisite control information to the corresponding source and destination such that data transfer operations can be executed without delaying computation code, thus allowing communication and computation to overlap in time. With the DMA engines asynchronously handling the formation and communication of control information, processor cores are freed to perform other tasks while awaiting satisfaction of the data transfer requests.

Typically, a DMA engine copies data from one location to another by performing load/store operations in which the DMA engine loads the data from system memory over, e.g., a Peripheral Component Interconnect Express (PCIe) bus, and stores the data at another memory component such as a dynamic random access memory (DRAM). For example, a DMA engine manually stores data into caches by loading the data into a scratchpad memory and then copying the data into the caches. However, storing the data for the DMA engine expends bandwidth and requires software to find memory locations at which to store the data. In addition, a DMA engine typically indicates to the requesting entity that the copy has been completed. However, because prefetching has a semantic effect for an application, the requester of the prefetch does not need to wait for completion of the prefetch.

To facilitate asynchronous DMA prefetches of data to one or more caches of a processing system, FIGS. 1-6 illustrate techniques by which a DMA engine loads data from memory or another cache location without storing the data after loading it. As the data propagates past caches between the memory or other cache location that stores the requested data (referred to herein as "intermediate caches"), the data is selectively copied to the intermediate caches based on a cache replacement policy. Rather than the DMA engine manually storing the data into the intermediate caches, the cache replacement policies of the intermediate caches determine whether the data is copied into each respective cache and where in the replacement chain of the cache the data is placed.

By bypassing storing of the data, the DMA engine effectuates prefetching to the intermediate caches without expending unnecessary bandwidth or searching for a memory location to store the data, thus reducing latency and saving energy. In particular, by skipping a store of the data, the DMA engine obviates the need to allocate a store location, prevents the stores from polluting caches and causing needless evictions, and allows more flexibility in prioritizing the loading of data (e.g., by allowing speculative prefetches and ignoring page faults in the load).

In some embodiments, a processor (e.g., a compute unit) issues a command to the DMA engine to send a request to load data without storing the data on behalf of the DMA engine. In some embodiments, the command is an explicit prefetch command. The command itself indicates a priority of the request or specifies caches to which the requested data is to be copied in some embodiments. The request propagates through the processing system from the DMA engine toward a system memory. The request is perceived by cache controllers along the propagation path as a memory access request such that if the requested data is stored at an intermediate cache between the DMA engine and the system memory, the requested data is returned to the DMA engine from the location where the data is stored. Otherwise, the requested data is returned from the system memory. Based on the priority of the request and a cache replacement policy, each cache having exposure to the request determines whether to copy the requested data when the data is returned in response to the request. Thus, a cache controller for each cache selectively copies the data to its respective cache based on the cache replacement policy and the priority of the request.

In some embodiments, firmware of the DMA engine is configured such that the DMA engine is capable of performing only loads but not stores. In other embodiments, a hardware state machine of the DMA engine is adapted to receive a command from the processor instructing the DMA engine to perform only a load but not a store.

FIG. 1 is a block diagram of a processing system 100 including a direct memory access (DMA) engine 150 configured to prefetch data to one or more caches in accordance with some embodiments. The processing system 100 implements a multiple-die processing unit 101 according to some embodiments. In various embodiments, the multiple-die processing unit 101 is a parallel processor that includes any cooperating collection of hardware and/or software that perform functions and computations associated with accelerating graphics processing tasks, data parallel tasks, nested data parallel tasks in an accelerated manner with respect to resources such as conventional central processing units (CPUs), conventional graphics processing units (GPUs), and combinations thereof.

The processing system 100 includes one or more CPUs 170. Although one CPU 170 is shown in FIG. 1, some embodiments of the processing system 100 include more CPUs. A bus 176 supports data flows between endpoints within the processing system 100, including the multi-die processing unit 101 and the CPU 170, as well as other endpoints. In various embodiments, the CPU 170 is connected via the bus 176 to system memory 140, which is implemented in some embodiments as dynamic random access memory (DRAM). In various embodiments, the system memory 140 can also be implemented using other types of memory including static random access memory (SRAM), nonvolatile RAM, and the like. In the illustrated embodiment, the CPU 170 communicates with the system memory 140 and the multi-die processing unit 101 over the bus 176. However, some embodiments of the processing system 100 include the multi-die processing unit 101 communicating with the CPU 170 over a direct connection or via dedicated buses, bridges, switches, routers, and the like.

As illustrated, the CPU 170 includes a number of processes, such as executing one or more application(s) 172 to generate graphic or other parallel processing commands. In various embodiments, the one or more applications 172 include applications that utilize the functionality of the multi-die processing unit 101, such as applications that generate work in the processing system 100 or an operating system (OS). In some implementations, an application 172 includes one or more graphics instructions that instruct the multiple-die processing unit 101 to render a graphical user interface (GUI) and/or a graphics scene. For example, in some implementations, the graphics instructions include instructions that define a set of one or more graphics primitives to be rendered by the multiple-die processing unit 101.

In some embodiments, the application 172 utilizes a graphics application programming interface (API) 174 to invoke a user mode driver (not shown) (or a similar GPU driver). The user mode driver issues one or more commands to the multiple-die processing unit 101 for rendering one or more graphics primitives into displayable graphics images. Based on the graphics instructions issued by application 172 to the user mode driver, the user mode driver formulates one or more graphics commands that specify one or more operations for multiple-die processing unit 101 to perform for rendering graphics. In some embodiments, the user mode driver is a part of the application 172 running on the CPU 170. For example, in some embodiments the user mode driver is part of a gaming application running on the CPU 170. Similarly, in some implementations a kernel mode driver (not shown), alone or in combination with the user mode driver, formulates the one or more graphics commands as part of an operating system running on the CPU 170.

The multiple-die processing unit 101 illustrated in FIG. 1 includes two chiplet sets 102, 112. Each chiplet set 102, 112 includes a configurable number of compute units 104, 114. Each compute unit 104, 114 includes one or more single-instruction-multiple-data (SIMD) units that perform operations in a parallel manner according to a SIMD paradigm. The SIMD paradigm is one in which multiple processing elements share a single program control flow unit and program counter and thus execute the same program but are able to execute that program with different data. Although two chiplet sets 102, 112 are illustrated in FIG. 1, some embodiments of the multiple-die processing unit 101 include more or fewer include more or fewer chiplet sets. Each CU 104, 114 has an associated L1 cache 106 to store data accessed directly by the corresponding CU 104, 114 and a corresponding L1 cache controller (not shown). In addition, each set of CUs 104, 114 in a chiplet set 102, 112 is connected to an L2 cache die (e.g., L2 cache 108, L2 cache 118) that stores frequently used data and instructions for access by the CUs 104, 114 and a corresponding L2 cache controller (not shown). In some embodiments, each L2 cache 108, 118 is connected to one or more L1 caches 106, 116 that are implemented in the respective chiplet sets 102, 112 and one or more L3 caches (or other last level caches) such as L3 cache 122 implemented in the processing system 100. The caches collectively form a cache hierarchy. Each chiplet set 102, 112 is further connected to respective off-die memories such as system memory 140 via respective local memory channels (not shown).

In the depicted embodiment of FIG. 1, a coherent data fabric 120 communicably couples the L2 caches 108, 118 to each other. The coherent data fabric 120 includes a crossbar switch for routing memory access requests and memory responses between any memory accessing. In some embodiments, the coherent data fabric 120 also includes a system memory map, defined by basic input/output system (BIOS), for determining destinations of memory accesses based on the system configuration, as well as buffers for each virtual connection.

Each of the chiplets sets 102, 112 also includes one or more DMA engines such as DMA engines 150, 160. In various embodiments, the one or more DMA engines 150 coordinate DMA transfers of data between devices and memory (or between different locations in memory) within the processing system 100. The one or more DMA engines 150 coordinate, in various embodiments, moving of data between the multiple caches and system memory 140 while computation(s) are performed on other data at, for example, the CUs 104, 114. In various embodiments, the one or more DMA engines 150 are, in some embodiments, part of a DMA controller (not shown) but the terms DMA engine and DMA controller are used interchangeably herein. The DMA engines 150, in response to commands, operate to transfer data into and out of, for example, one or more of the caches without involvement of the compute units 104, 114. Similarly, the DMA engines 150, in some embodiments, performs intra-chip data transfers. As will be appreciated, the DMA engines 150 relieve processor cores from the burden of managing data transfers, and in various embodiments are used to prefetch data into one or more of the caches based on a cache replacement policy.

To facilitate prefetching data into levels of the cache hierarchy, the DMA engine 150 is configured to load requested data without storing the data. As the requested data propagates toward the DMA engine 150 that issued the request from the cache or system memory 140 in which the data is located, intermediate cache controllers selectively copy the data into their respective caches based on a cache replacement policy for the respective cache and a priority of the requested data. In some embodiments, the DMA engine 150 receives a command in the form of a software packet or via hardware wiring from the application 172 or from the associated CU 104 indicating to the DMA engine 150 a request to prefetch an amount of data (e.g., a number of bytes) from a specified address. In some embodiments, the command includes a stride or access pattern for prefetching non-linear locations. The command also indicates a priority in some embodiments. Based on the priority indicated by the command, the DMA engine 150 selectively ignores the command or interrupts prefetching in favor of higher-priority work (e.g., in response to the priority being low).

Figure 2:
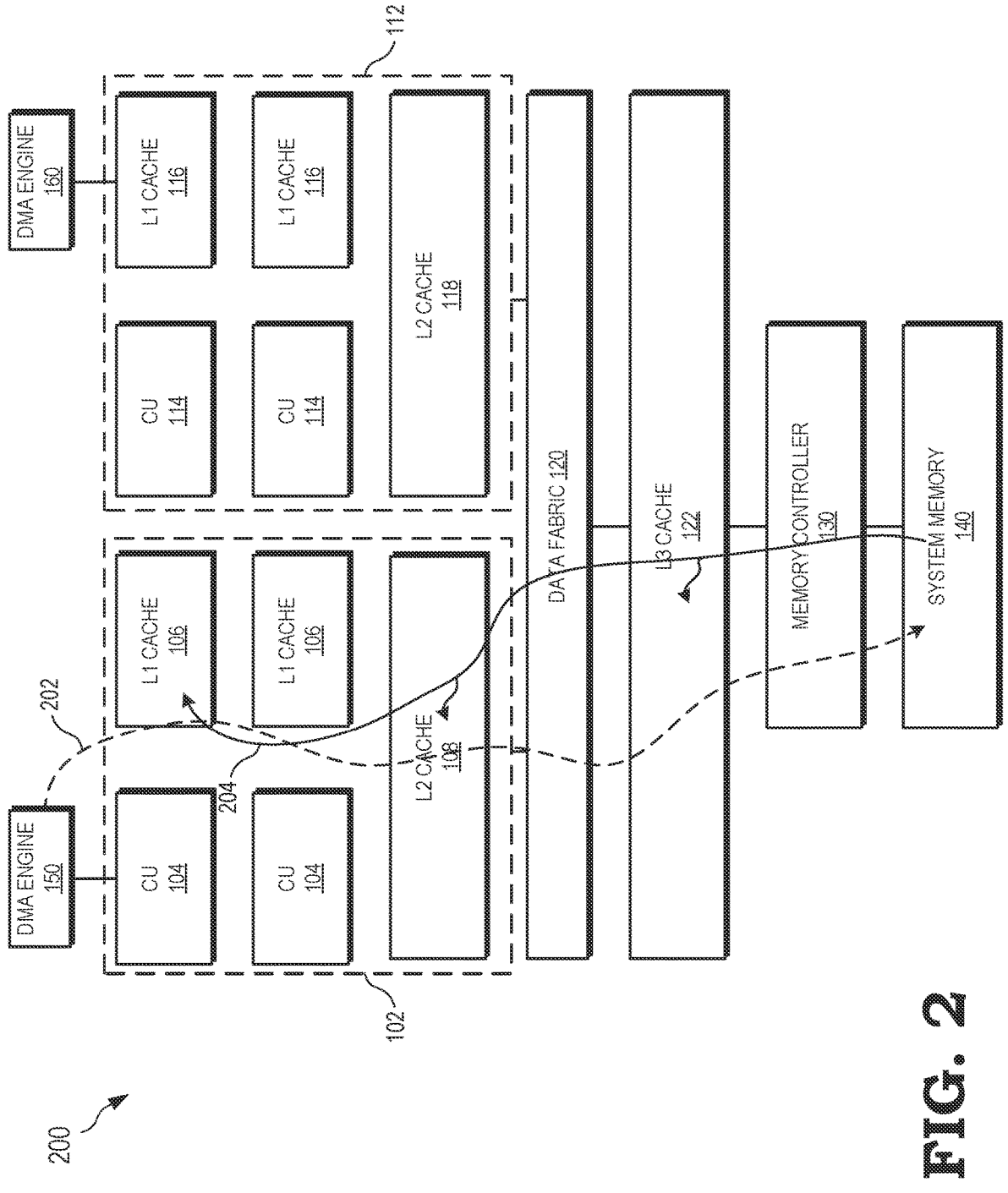
FIG. 2 is a block diagram of the processing system illustrating a DMA engine sending a prefetch request for data to system memory and caches between the system memory and the DMA engine selectively copying the data based on a cache replacement policy in accordance with some embodiments.

FIG. 2 is a block diagram 200 illustrating the DMA engine 150 of the processing system 100 sending a prefetch request 202 for data to system memory 140 and caches between the system memory 140 and the DMA engine 150 selectively copying the data 204 returned in response to the prefetch request 202 based on a cache replacement policy in accordance with some embodiments.

In the illustrated example, the CU 104 issues a command (not shown) to the DMA engine 150 to prefetch data. In response to the command, the DMA engine 150 issues the prefetch request 202, which traverses the cache hierarchy from the L1 cache 106 to the L2 cache 108 through the data fabric 120 to the L3 cache 122. At each of the L1 cache 106, the L2 cache 108, and the L3 cache 122, the prefetch request 202 prompts a check of the cache to determine if data responsive to the prefetch request 202 is stored at the cache. If, for example, the prefetch request 202 misses at the L1 cache 106 and hits at the L2 cache 108, the data 204 is returned from the L2 cache 108 to the DMA engine 150. As the data 202 flows toward the DMA engine 150 past the L1 cache 106, the L1 cache controller (not shown) selectively copies the data 204 into the L1 cache 106, based on a cache replacement policy for the L1 cache 106 and, in some embodiments, additionally based on a priority indicated by the prefetch request 202.

In another example, if the prefetch request 202 misses at the L1 cache 106, the L2 cache 108, and the L3 cache 122, the prefetch request 202 retrieves the data 204 from system memory 140. The data 204 propagates back through the processing system 100 toward the DMA engine 150, and as the data 204 passes each of the L3 cache 122, the L2 cache 108, and the L1 cache 106, the cache controllers for each of the L3 cache 122, the L2 cache 108, and the L1 cache 106 selectively copy the data 204 into their respective caches based on their cache replacement policies and/or a priority indicated by the prefetch request 202.

In some embodiments, the cache replacement policies and/or the priority indicated by the prefetch request 202 results in the prefetch request 202 from the DMA engine 150 not just skipping the stores back out to memory but can also skipping the return of data any further up the cache hierarchy than a target level of cache. For example, if the priority indicates that the DMA engine 150 is to prefetch data into the L3 cache 122 for other processors, the prefetch request 202 propagates through the L1 cache 106 and L2 cache 108 to the L3 cache 122 and, if the prefetch request 202 misses at these levels of cache, to the system memory 140. However, based on the priority indicated by the prefetch request 202, rather than return the data 204 from the L3 cache 122 to the L2 cache 108 and then to the L1 cache 106 and the DMA engine 150, the prefetch request 202 does not return the data 204 to the L2 cache 108, the L1 cache 106, or the DMA engine 150 after being cached in the L3 cache 122. Thus, in this example, the data 204 is selectively copied only to the L3 cache 122. By not copying the data 204 to the other levels of the cache hierarchy or the DMA engine 150, the prefetch request 202 saves bandwidth and power between L3 cache 122, the L2 cache 108, the L1 cache 106, and the DMA engine 150, as well as the store back out. In some embodiments, an acknowledgement (not shown) is propagated to the DMA engine 150 to inform the DMA engine 150 that the prefetch to the L3 cache 122 has been completed, even though the data 204 is not propagated past the L3 cache 122. In other embodiments, in the event a prefetch request 202 is dropped due to being a low priority case in a contended system, the returns (and acknowledgement) are dropped entirely.

Using the DMA engine 150 to prefetch data without storing the data accomplishes prefetching to caches while avoiding the overhead of stores, the additional computational resources of a prefetch kernel, and the inaccuracy of a hardware prefetcher. For example, if a host-side application programmer knows that a first kernel may require access to several dozen megabytes of data (data X) and will be followed by a second kernel that may require access to a different several dozen megabytes of data (data Y), after launching the first kernel to the compute units of a chiplet set, the application submits a command to the chiplet set's DMA engine to prefetch data Y. The prefetch of data Y occurs while the first kernel executes and loads data Y into one or more caches in preparation for execution of the second kernel.

If such a prefetch were performed by a conventional DMA engine copy command that causes the DMA engine to asynchronously copy data Y to a particular location, the location would have to be assigned and the store to the location would exact a bandwidth overhead. If the prefetch were performed by a prefetch kernel, the prefetch kernel would contend with the first kernel for computational resources. Finally, if such a prefetch were performed by a hardware prefetcher, the hardware prefetcher may fail to prefetch data Y in the event data Y is not associated with the first kernel's access patterns, as hardware prefetchers typically perform prefetches based on heuristics that predict future memory accesses based on recent memory accesses.

Figure 3:
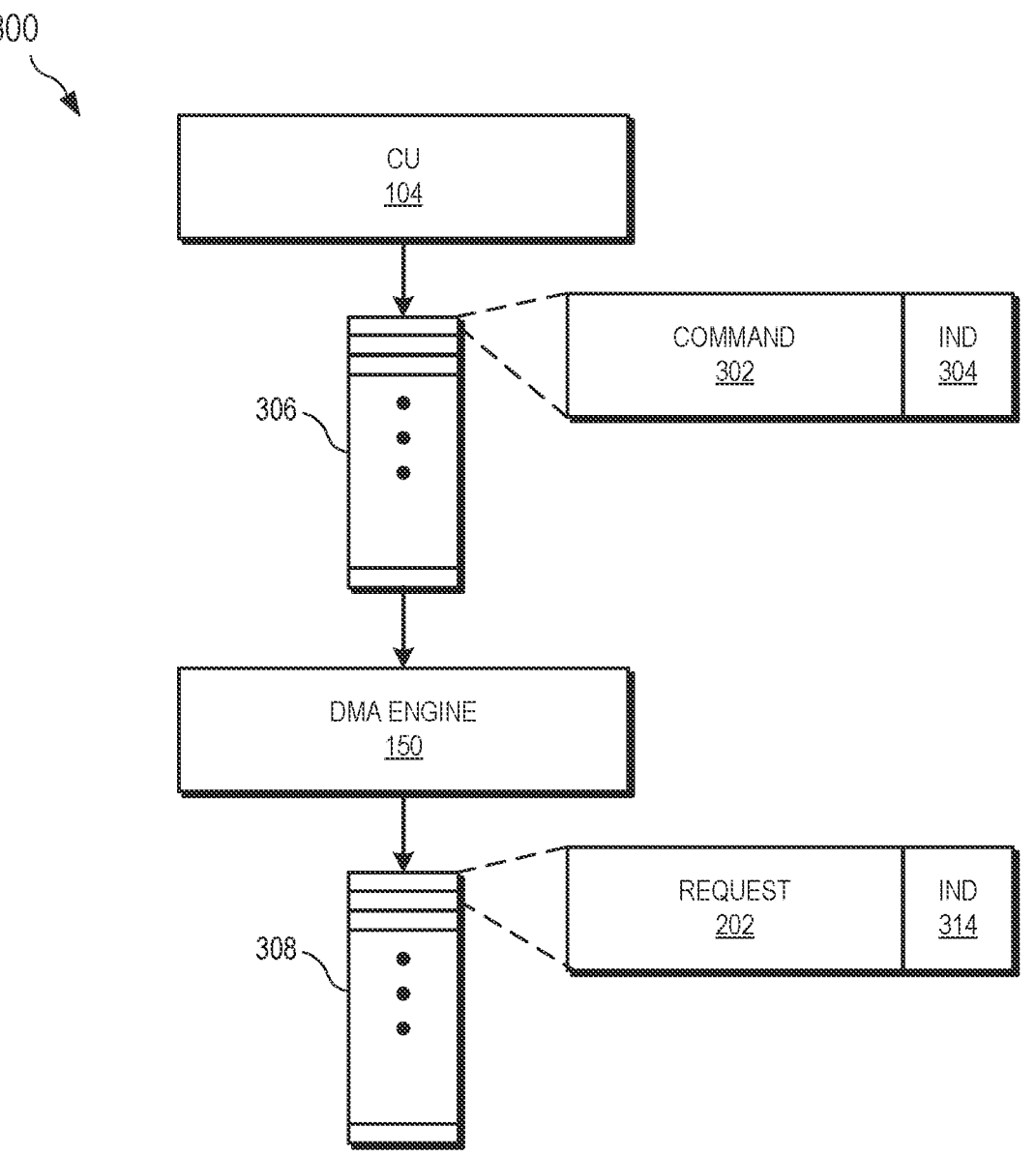
FIG. 3 is a block diagram illustrating a compute unit sending a prefetch command to a DMA engine and the DMA engine sending a prefetch request based on the command in accordance with some embodiments.

FIG. 3 is a block diagram 300 illustrating the CU 104 sending a prefetch command 302 to the DMA engine 150 and the DMA engine 150 sending a prefetch request 202 based on the command 302 in accordance with some embodiments. A queue 306 is associated with the DMA engine 150. The queue 306 holds one or more commands such as command 302 for the DMA engine 150. In the illustrated embodiment, the command 302 includes an indication 304 of the priority of the command 302. If the indication 304 indicates that the priority of the command 302 is low, in some embodiments, the DMA engine 150 ignores the command 302 in favor of higher priority work and only executes the command 302 when the DMA engine 150 would otherwise be idle.

A scheduler (not shown) schedules command buffers from the head entries of the queue 306 for execution at the DMA engine 150. In some circumstances, the CU 104 operates in a user mode so that the scheduler is able to generate and schedule commands in addition to the commands that are received from a user mode driver (not shown) in the CPU 170. The scheduler is able to schedule the commands for execution at the DMA engine 150 without notifying the CU 104. The scheduler provides the commands to the queue 306. For example, in some embodiments, the scheduler schedules one or more commands to program the DMA engine 150 to prefetch a block of data starting at an address X.

During operation, in response to notifications (e.g., doorbell rings), the DMA engine 150 reads and executes the DMA prefetch commands 302 (with its associated parameters and priority indication 304) from the DMA queue 306 to execute data prefetch operations. In various embodiments, the operation parameters (e.g., DMA command parameters) are usually the base address, the stride, the element size and the number of elements to communicate, for both the sender and the receiver sides.

Based on the commands 302, the DMA engine 150 generates prefetch requests such as request 202, which are provided to a queue 308. In the illustrated embodiment, the prefetch request 202 includes an indication 314 of the priority of the prefetch request 202. As the prefetch request 202 propagates through the processing system 100, cache controllers for caches along the propagation path read the indication 314 and determine based on a cache replacement policy and the indication 314 whether to copy and store the data returned in response to the request at their respective caches and where in a replacement chain to store the data.

Figure 4:
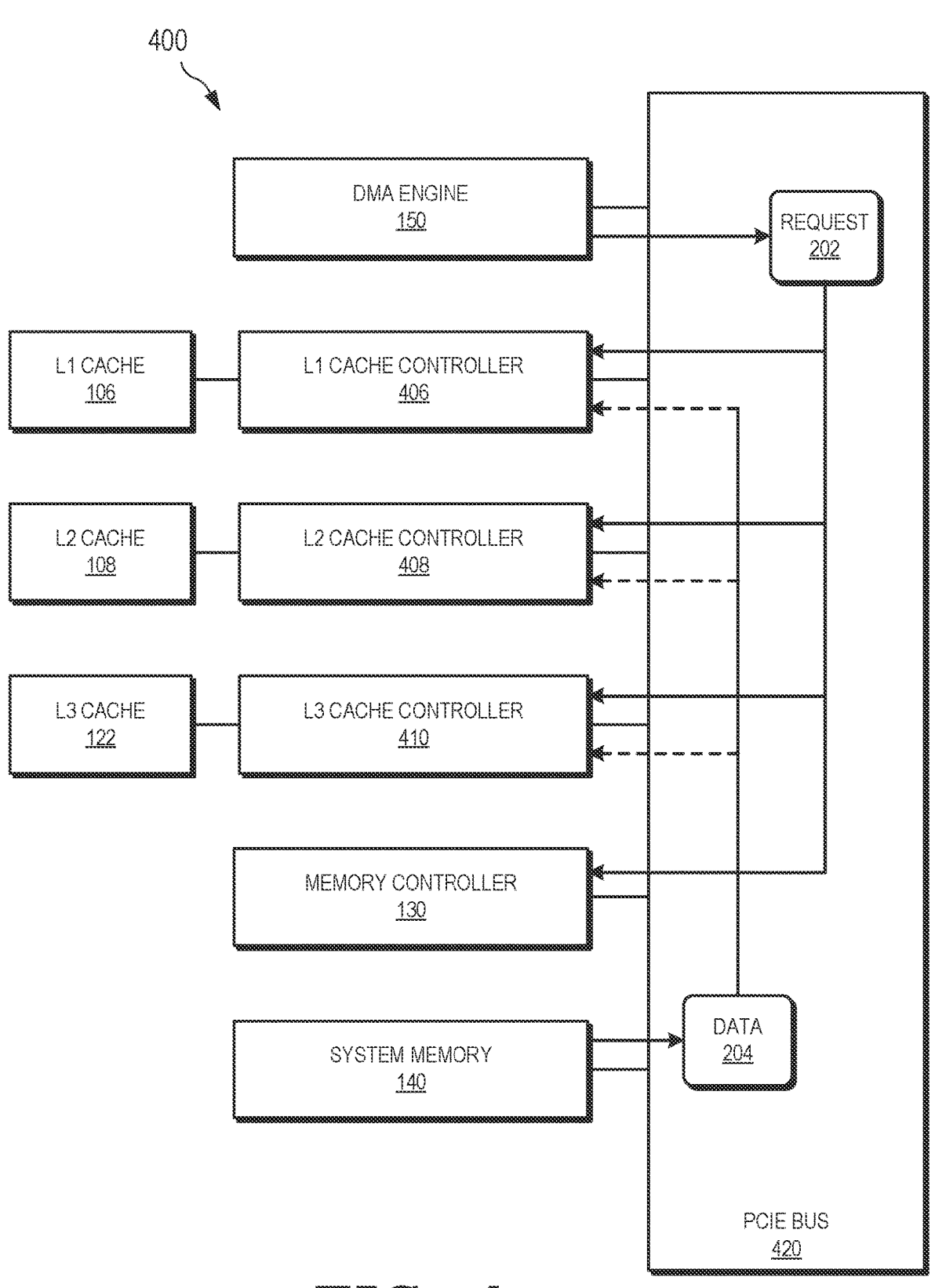
FIG. 4 is a block diagram of a portion of the processing system illustrating a prefetch request from a DMA engine propagating via a PCIe bus to the system memory and intermediate cache controllers selectively copying the requested data based on a cache replacement policy in accordance with some embodiments.

FIG. 4 is a block diagram of a portion 400 of the processing system 100 illustrating a prefetch request 202 from the DMA engine 150 propagating via a PCIe bus 420 to the system memory 140 and intermediate cache controllers 406, 408, 410 selectively copying the requested data 204 based on a cache replacement policy in accordance with some embodiments.

In the illustrated example, the DMA engine 150 issues a prefetch request 202 via the PCIe bus 420. The prefetch request 202 propagates first to the L1 cache controller 406. The L1 cache controller 406 determines if the data 204 requested in the prefetch request 202 is stored at the L1 cache 106. If the data is stored at the L1 cache 106, the request 202 does not propagate further along the PCIe bus 420. The data 204 is returned to the DMA engine 150, which does not store the data (i.e., the DMA engine 150 discards the data 204).

If the data 204 is not stored at the L1 cache 106, the request 202 propagates next to the L2 cache controller 408, which determines if the data 204 requested in the prefetch request 202 is stored at the L2 cache 108. If the data 204 is stored at the L2 cache 108, the data is returned toward the DMA engine 150 via the PCIe bus 420. As the data 204 propagates past the L1 cache controller 406, the L1 cache controller 406 determines whether to copy the data 204 to the L1 cache 106 based on a cache replacement policy of the L1 cache 106 and the indication 314 of the priority of the data 204.

If the data 204 is not stored at the L2 cache 106, the prefetch request 202 next propagates to the L3 cache controller 410, which determines if the data 204 requested in the prefetch request 202 is stored at the L3 cache 122. If the data 204 is stored at the L3 cache 122, the data 204 is returned toward the DMA engine 150 via the PCIe bus 420. As the data 204 propagates past the L2 cache controller 408 and the L1 cache controller 406, the L2 cache controller 408 and the L1 cache controller 406 determine whether to copy the data 204 to the L2 cache 108 and the L1 cache 106, respectively, based on the cache replacement policies of the L2 cache 108 and the L1 cache 106 and the indication 314.

If the data 204 was found at any of the L1 cache 106, L2 cache 108, or the L3 cache 122, the satisfaction of the prefetch request 202 at any of the caches results in a cache hit which affects the priority of the data 204 according to the cache replacement policy for the respective caches. For example, if the data 204 is found at the L2 cache 108 and the L2 cache 108 employs a least recently used (LRU) cache replacement policy, the data 204 will be considered most recently used, and will therefore be less likely to be evicted from the L2 cache 108.

If the data 204 is not stored at the L3 cache 122, the prefetch request propagates to the memory controller 130. The memory controller 130 returns the requested data 204 from the system memory 140. As the requested data 204 propagates along the PCIe bus 420 toward the DMA engine 150, each respective cache controller determines based on a cache replacement policy for their respective caches and the indication 314 of the priority of the data 204 whether to copy the data 204 to their respective caches and where in a replacement chain to place the data 204 within the cache. Thus, for example, the L3 cache controller 410 determines whether to copy the data 204 to the L3 cache 122 based on a cache replacement policy for the L3 cache 122. In addition, in some embodiments, the L3 cache controller 410 determines where in a priority chain of the L3 cache 122 to place the data 204.

Similarly, as the data 204 propagates further along the PCIe bus 420 toward the DMA engine 150, the L2 cache controller 408 determines, based on a cache replacement policy of the L2 cache 108 and the indication 314, whether to copy the data 204 to the L2 cache 108 and where in a priority chain of the L2 cache 108 to place the data 204. The L1 cache controller 406 also determines whether to copy the data 204 to the L1 cache 106 and where in a priority chain of the L1 cache 106 to place the data 204, based on a cache replacement policy of the L1 cache 106 and the indication 314.

Figure 5:
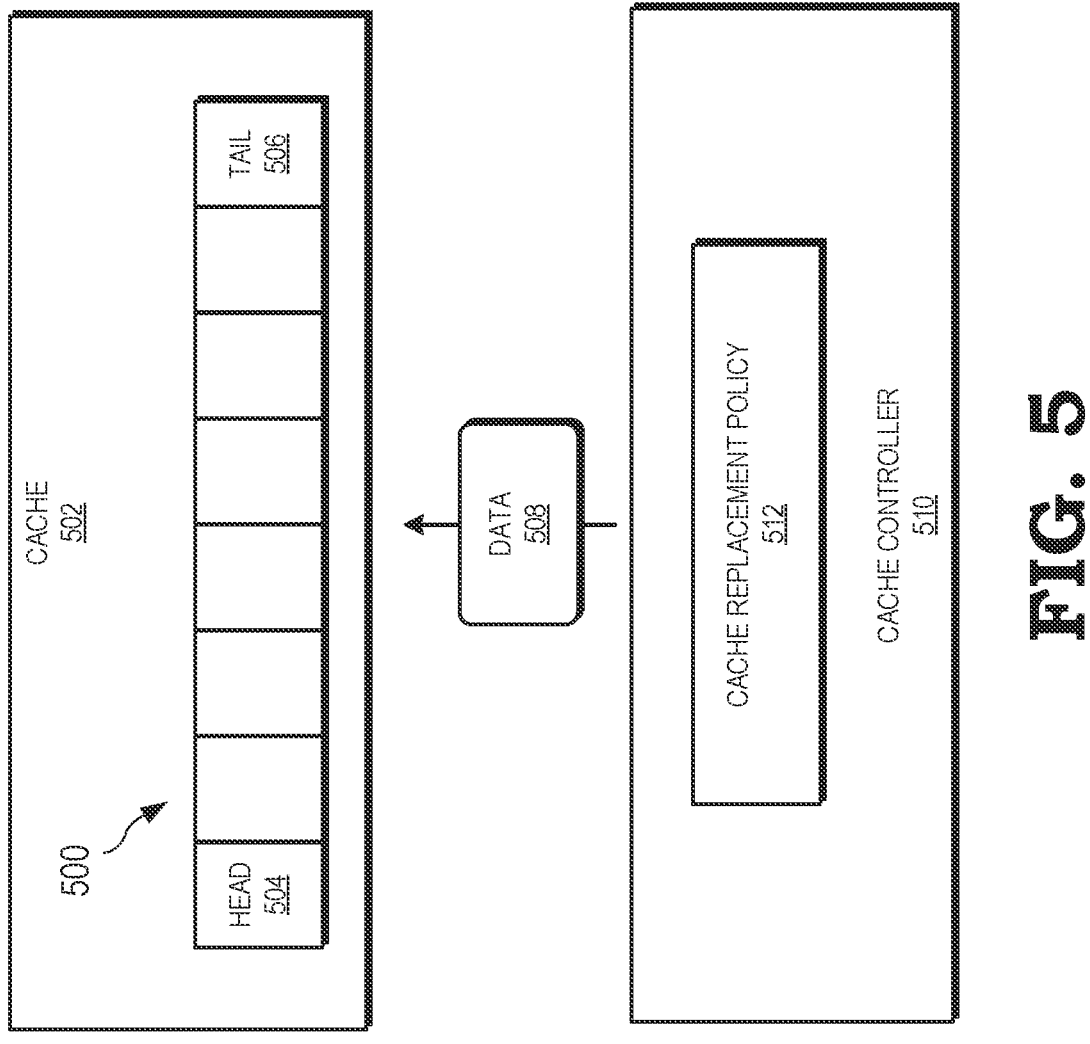
FIG. 5 illustrates a cache controller selecting where in a replacement chain of a cache to insert data prefetched by a DMA engine based on a cache replacement policy in accordance with some embodiments.

FIG. 5 illustrates a cache controller 510 selecting where in a reference chain 500 of a cache 502 to insert data prefetched by a DMA engine based on a cache replacement policy 512 in accordance with some embodiments. Data is accorded a replacement priority based on the cache replacement policy 512 in accordance with some embodiments. In some embodiments, data is further prioritized based on the indication 314 of the priority of requested data. If a non-random replacement policy is used, the cache 502 effectively maintains an ordered list of eviction candidates, which in the case of an LRU or most recently used (MRU)-type policy can be referred to as a reference chain of entries in which accessed entries are promoted to a head 504 of the chain according to the replacement policy. Under an LRU policy, entries are evicted from a tail 506 of the chain, whereas under an MRU policy, entries are evicted from the head 504 of the chain.

In the illustrated example, the cache 502 includes a reference chain 500 of cache entries. Under a cache replacement policy that neither favors nor disfavors data returned in response to a prefetch request from a DMA engine, data fetched to the cache 502 is initially placed at the middle of the reference chain (i.e., the data is accorded a neutral replacement priority). If the data is subsequently requested, the data moves toward the head 504 of the reference chain. As additional data is fetched to the cache 502, the data initially stored at middle of the reference chain, if not requested, moves toward the bottom of the reference chain, referred to as the tail 506 of the reference chain. When data is evicted from the cache 502, the data is replaced from the tail 506 of the reference chain. Under the cache replacement policy 512, the cache controller 510 assigns all data 508

(including data copied to the cache 502 in response to a DMA prefetch request 202) to the same priority within the reference chain when first fetched to the cache 502.

If the cache replacement policy 512, prioritizes data 204 copied to the cache 502 in response to a DMA prefetch request 202, the cache controller 510 assigns the data 204 a priority that places the data 204 a priority that places the data 204 toward the head 504 of the reference chain 500. Accordingly, other data is more likely to reach the tail 506 of the reference chain 500 before the DMA prefetched data 204, and therefore faces a higher probability of being evicted from the cache 502 than the prefetched data 204.

Figure 6:
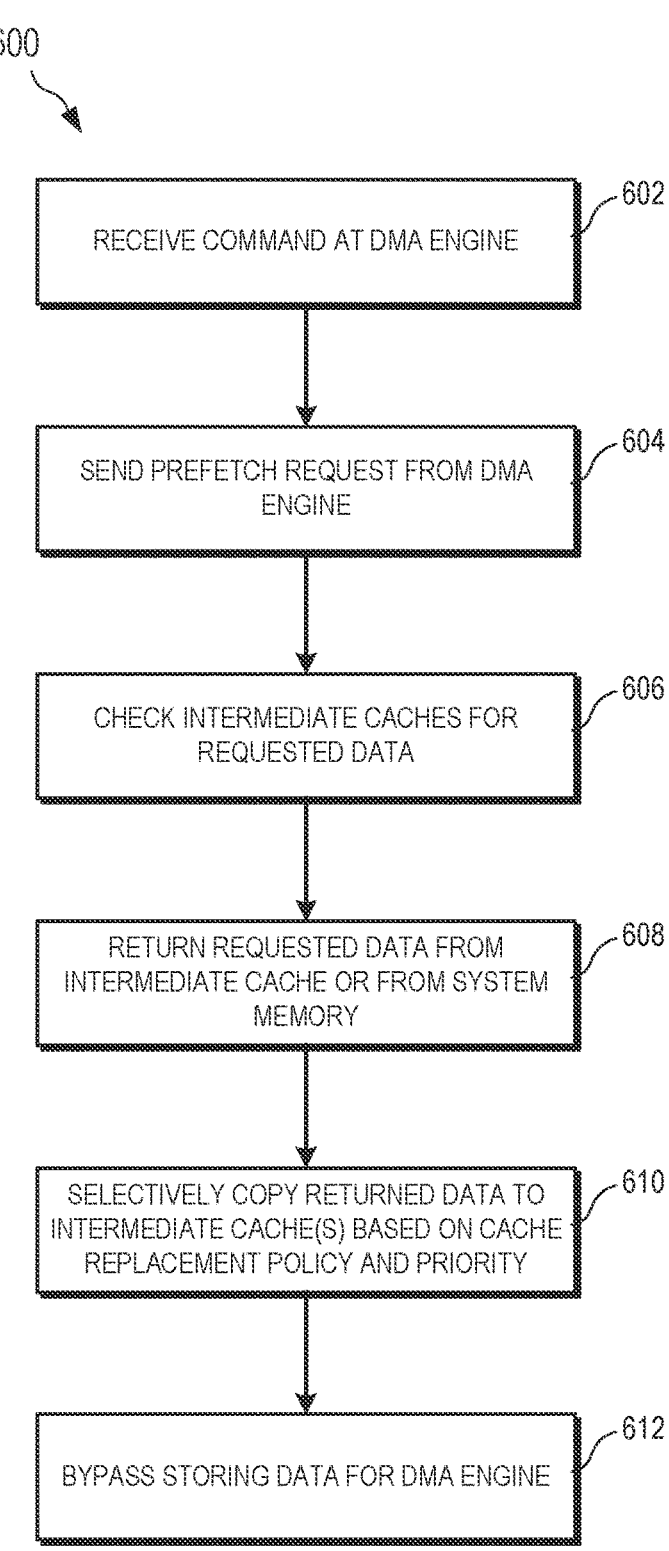
FIG. 6 is a flow diagram illustrating a method for prefetching data using a DMA engine in accordance with some embodiments.

FIG. 6 is a flow diagram illustrating a method 600 for prefetching data using a DMA engine in accordance with some embodiments. In some embodiments, the method 600 is implemented in a processing system such as processing system 100.

At block 602, the DMA engine 150 receives a command 302 to load data without storing the data. In some embodiments, the command 302 is issued by a CU 104 associated with the DMA engine 150 and in other embodiments, the command 302 is issued by an application 172 executing at the CPU 170. The command 302 is stored at a queue 306 and includes an indication 304 of the priority of the command 302 in some embodiments. If the indication 304 is that the priority of the command 302 is low, in some embodiments, the DMA engine 150 ignores the command 302 in favor of higher priority work.

At block 604, the DMA engine 150 sends a request for data indicated by the command 302. In some embodiments, the request is a prefetch request 202 and in other embodiments, the request is a request to load data without storing the data. The DMA engine 150 propagates the request 202 toward the system memory 140 along a PCIe bus 420 or other communication medium employed by the processing system 100. As the request 202 propagates through a cache hierarchy of the processing system 100, at block 606, each cache controller for each cache of the cache hierarchy checks whether the requested data is stored at their respective caches.

At block 608, if the requested data 204 is found at an intermediate cache, the data is returned to the DMA engine 150. If the requested data 204 is not found at any of the caches of the cache hierarchy, the memory controller 130 returns the data 204 from the system memory 140.

At block 610, each cache controller between the cache where the data was found and the DMA engine 150 selectively copies the data 204 to their respective caches based on a cache replacement policy and an indication 314 of the priority of the data 204.

At block 612, after the data 204 has been selectively copied to the intermediate caches based on their respective cache replacement policies and the indication 314 of the priority of the data 204, the DMA engine 150 bypasses storing the data 204. Thus, the DMA engine 150 does not allocate a location to store the data 204 and in some embodiments, the DMA engine 150 discards the data 204. The DMA engine 150 thereby prefetches the data 204 to one or more caches of the cache hierarchy without performing a store of the data 204.

In some embodiments, the apparatus and techniques described above are implemented in a system including one or more integrated circuit (IC) devices (also referred to as integrated circuit packages or microchips), such as the processing system described above with reference to FIGS. 1-6. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

One or more of the elements described above is circuitry designed and configured to perform the corresponding operations described above. Such circuitry, in at least some embodiments, is any one of, or a combination of, a hard-coded circuit (e.g., a corresponding portion of an application specific integrated circuit (ASIC) or a set of logic gates, storage elements, and other components selected and arranged to execute the ascribed operations), a program-mable circuit (e.g., a corresponding portion of a field pro-grammable gate array (FPGA) or programmable logic device (PLD)), or one or more processors executing soft-ware instructions that cause the one or more processors to implement the ascribed actions. In some embodiments, the circuitry for a particular element is selected, arranged, and configured by one or more computer-implemented design tools. For example, in some embodiments the sequence of operations for a particular element is defined in a specified computer language, such as a register transfer language, and a computer-implemented design tool selects, configures, and arranges the circuitry based on the defined sequence of operations.

Within this disclosure, in some cases, different entities (which are variously referred to as "components," "units," "devices," "circuitry", etc.) are described or claimed as "configured" to perform one or more tasks or operations. This formulation [entity] configured to [perform one or more tasks]—is used herein to refer to structure (i.e., something physical, such as electronic circuitry). More specifically, this formulation is used to indicate that this physical structure is arranged to perform the one or more tasks during operation. A structure can be said to be "configured to" perform some task even if the structure is not currently being operated. A "memory device configured to store data" is intended to cover, for example, an integrated circuit that has circuitry that stores data during operation, even if the integrated circuit in question is not currently being used (e.g., a power supply is not connected to it). Thus, an entity described or recited as "configured to" perform some task refers to something physical, such as a device, circuitry, memory storing program instructions executable to implement the task, etc. This phrase is not used herein to refer to something intangible.

Further, the term "configured to" is not intended to mean "configurable to." An unprogrammed field programmable gate array, for example, would not be considered to be "configured to" perform some specific function, although it could be "configurable to" perform that function after pro-gramming. Additionally, reciting in the appended claims that a structure is "configured to" perform one or more tasks is expressly intended not to be interpreted as having means-plus-function elements.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   loading data from a memory in response to a prefetch request from a direct memory access (DMA) engine associated with a processor; and
   responsive to loading the data, selectively copying the data to one or more caches of the processor located between the DMA engine and the memory.

2. The method of claim 1, further comprising:
   receiving a command at the DMA engine to send the request to load the data without storing the data.

3. The method of claim 2, wherein the command indicates a priority of the request.

4. The method of claim 1, wherein the memory is one of system memory or a second cache of the processor.

5. The method of claim 1, wherein selectively copying the data at the one or more caches is based on a cache replacement policy.

6. The method of claim 5, wherein the cache replacement policy determines the one or more caches into which the data is copied.

7. The method of claim 5, wherein the cache replacement policy determines a replacement priority for the data.

8. A processing system, comprising:
   a processor;
   a memory;
   a direct memory access (DMA engine) configured to send a prefetch request to load data from the memory; and
   one or more cache controllers configured to selectively copy the data to one or more caches of the processor located between the DMA engine and the memory responsive to loading the data.

9. The processing system of claim 8, wherein the DMA engine is further configured to bypass storing the data in response to receiving a command to send the prefetch request to load the data without storing the data.

10. The processing system of claim 9, wherein the command indicates a priority of the command.

11. The processing system of claim 8, wherein the memory is one of system memory or a second cache of the processor.

12. The processing system of claim 8, wherein selectively copying the data at the one or more caches is based on a cache replacement policy.

13. The processing system of claim 12, wherein the cache replacement policy determines the one or more caches into which the data is copied.

14. The processing system of claim 12, wherein the cache replacement policy determines a replacement priority for the data.

15. A processing system, comprising:
   a processor;
   a memory hierarchy comprising one or more caches and a memory;
   a direct memory access (DMA) engine configured to issue a prefetch request to the memory hierarchy; and
   one or more cache controllers configured to selectively copy data returned in response to the prefetch request to the one or more caches located between the DMA engine and the memory.

16. The processing system of claim 15, wherein the DMA engine is configured to send the prefetch request to load the data without storing the data.

17. The processing system of claim 16, wherein the one or more cache controllers are configured to selectively copy the data based on a cache replacement policy.

18. The processing system of claim 17, wherein the cache replacement policy determines a replacement priority for the data.

\* \* \* \* \*